United States Patent
Zhang et al.

(10) Patent No.: US 10,152,932 B2
(45) Date of Patent: *Dec. 11, 2018

(54) CONTROLLING DEVICE AND METHOD FOR FREQUENCY SYNCHRONIZATION AND LCD TELEVISION

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Shili Zhang, Qingdao (CN); Haoqiang Fang, Qingdao (CN); Qinghua Tian, Qingdao (CN); Zhongjun Zhang, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,064

(22) Filed: Dec. 29, 2017

(65) Prior Publication Data
US 2018/0122316 A1 May 3, 2018

Related U.S. Application Data

(63) Continuation of application No. 15/471,912, filed on Mar. 28, 2017, now Pat. No. 9,892,698.

(30) Foreign Application Priority Data

Sep. 20, 2016 (CN) .......................... 2016 1 0834444

(51) Int. Cl.
*H04N 9/475* (2006.01)
*G09G 3/36* (2006.01)

(52) U.S. Cl.
CPC ....... *G09G 3/3611* (2013.01); *G09G 2370/08* (2013.01); *H04N 9/475* (2013.01)

(58) Field of Classification Search
CPC  H04N 9/475; H04N 5/06; H04N 5/12; G09G 3/36; G09G 3/3611; G09G 2370/08
(Continued)

(56) References Cited

U.S. PATENT DOCUMENTS 6,304,243 B1 * 10/2001 Kondo ................. G09G 3/3611
257/E27.111
7,193,677 B2 * 3/2007 Ino ...................... G02F 1/13452
349/149

(Continued)

FOREIGN PATENT DOCUMENTS

| CN | 1386255 A | 12/2002 |
|---|---|---|
| CN | 1645463 A | 7/2005 |
| CN | 204993623 U | 1/2016 |

OTHER PUBLICATIONS

Office Action from Chinese Application No. 201610834444.4 dated Sep. 25, 2018 (5 pages).

*Primary Examiner* — Trang U Tran
(74) *Attorney, Agent, or Firm* — Harness, Dickey & Pierce, P.L.C.

(57) ABSTRACT

Disclosed are a controlling device and method for frequency synchronization as well as a LCD TV. The method is applied to an LCD TV, wherein the LCD TV includes a front-end motherboard chip, a main drive control chip and a plurality of column drive control chips, the method includes: when the main drive control chip recognizes that its operating frequency is unstable, it generates a clock turn-off signal; the main drive control chip transmits fixed data to each column drive control chip according to the clock turn-off signal and receives a clock training request initiated by each column drive control chip according to the fixed data; and when (Continued)

recognizing that the operating frequency synchronizes with a frequency corresponding to front-end data transmitted by the front-end motherboard chip, the main drive control chip responds to the clock training request and transmits clock training data to each column drive control chip.

15 Claims, 6 Drawing Sheets

(58) Field of Classification Search
USPC .............................. 348/516, 512, 513, 521
See application file for complete search history.

(56) References Cited

U.S. PATENT DOCUMENTS

| | | | | |
|---|---|---|---|---|
| 7,830,348 B2 * | 11/2010 | Hung | ............... | G09G 3/3648 |
| | | | | 345/98 |
| 8,502,899 B2 * | 8/2013 | Wakabayashi | ...... | H03M 1/0658 |
| | | | | 341/155 |
| 2006/0227646 A1 | 10/2006 | Kasamsetty et al. | | |

* cited by examiner

CONTROLLING DEVICE AND METHOD FOR FREQUENCY SYNCHRONIZATION AND LCD TELEVISION

CROSS-REFERENCE TO RELATED APPLICATIONS

This application is a continuation of U.S. patent application Ser. No. 15/471,912 filed Mar. 28, 2017, which claims the benefit and priority of Chinese Patent Application No. 201610834444.4 filed Sep. 20, 2016. The entire disclosures of the above applications are incorporated herein by reference.

FIELD

The present disclosure relates to the field of communication technology, and particularly to a controlling device and method for frequency synchronization and a liquid-crystal-display television ((LCD TV).

BACKGROUND

This section provides background information related to the present disclosure which is not necessarily prior art.

From traditional black and white to color, from standard definition to high definition, from the 4K2K ultra high-definition to the future 8K4K, as display resolution upgrades, the amount of data required to be transmitted within an LCD TV increases as well. In particular, the amount of data transmitted between a display panel and a drive control circuit (such as a main drive control chip and a column drive control chip) is multiplied manyfold as the display resolution upgrades.

For example, a commonly used interface of a display panel is mini-LVDS, whose transmission rate is usually 300 MHz. Using the same transmission protocol for data transmission, when the display panel is a high definition panel, 16 data cables are needed; when the display panel is a 4K2K panel, 56 data cables are needed; and when the display panel is an 8K4K panel, 224 data cables are needed. In other words, the number of cables required for an 8K4K panel is 14 times as the number of cables required for a high definition panel.

Since it would worsen the reliability and the electrical performance (such as the electromagnetic compatibility, EMC) of an LCD television to increase the number of cables connected blindly, a point-to-point communication method using a high speed communication protocol is used to increase the data transmission rate, without increasing the number of cables connected, so that huge amount of data could be transmitted within an LCD television.

According to the high-speed protocol, the frequency synchronization process in the existing point-to-point method is: a pre-stage communication apparatus, when its operating frequency is unstable, by responding to a clock training request initiated by the post-stage communication apparatus due to recognition of the instability of operating frequency of the pre-stage communication apparatus, performs clock training on the post-stage communication apparatus, so that the operating frequency of the post-stage communication apparatus could stay the same as the operating frequency of the pre-stage communication apparatus, thus realizing frequency synchronization between the pre-stage communication apparatus and the post-stage communication apparatus; and after the clock training of the post-stage communication apparatus has succeeded, both communication apparatuses enter into working state to transmit valid data.

SUMMARY

This section provides a general summary of the disclosure, and is not a comprehensive disclosure of its full scope or all of its features.

A controlling device for frequency synchronization, applied to an LCD TV, wherein the LCD TV includes a front-end motherboard chip, a main drive control chip and a plurality of column drive control chips, and the device includes the main drive control chip, and a memory, the main drive control chip is common to the LCD TV and the device, wherein the memory stores instructions executable by the main drive control chip, and the instructions are executed by the main drive control chip to enable the main drive control chip to:

when recognizing that an operating frequency of the main drive control chip is unstable, generate a clock turn-off signal;

transmit fixed data to each of the column drive control chips according to the clock turn-off signal and receive a clock training request initiated by each of the column drive control chips according to the fixed data; and when recognizing that the operating frequency synchronizes with the frequency corresponding to front-end data transmitted by the front-end motherboard chip, respond to the clock training request and transmit clock training data to each of the column drive control chips.

A controlling method for frequency synchronization, applied to a LCD TV, wherein the LCD TV includes a front-end motherboard chip, a main drive control chip and a plurality of column drive control chips, the method includes:

when the main drive control chip recognizes that its operating frequency is unstable, it generates a clock turn-off signal;

the main drive control chip transmits fixed data to each of the column drive control chips according to the clock turn-off signal and receives a clock training request initiated by each of the column drive control chips according to the fixed data; and when the main drive control chip recognizes that the operating frequency synchronizes with a frequency corresponding to the front-end data transmitted by the front-end motherboard chip, the main drive control chip responds to the clock training request and transmits clock training data to each of the column drive control chips.

A controlling method for frequency synchronization, applied to a point-to-point communication system, wherein the point-to-point communication system includes a pre-stage communication apparatus and a plurality of post-stage communication apparatuses, the method comprising:

when the pre-stage communication apparatus recognizes that its operating frequency is unstable, it generates a clock turn-off signal;

the pre-stage communication apparatus transmits fixed data to each of the post-stage communication apparatuses according to the clock turn-off signal, and receives a clock training request initiated by each of the post-stage communication apparatuses according to the fixed data; and when recognizing that the operating frequency synchronizes with a frequency corresponding to the received front-end data, the pre-stage communication apparatus responds to the clock training request and transmits clock training data to each of the post-stage communication apparatuses.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
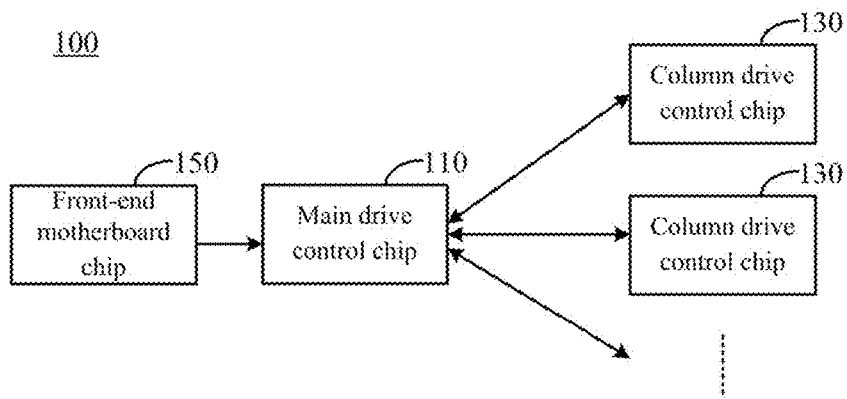
FIG. 1 is a schematic diagram of an implementation environment according to the present disclosure.

Explicit embodiments of the present disclosure have been shown through the drawings, which will be described in more detail later. The drawings and descriptions are not intended to limit the scope of the present disclosure by any means, rather, by referring to specific embodiments they are to explain the concepts of the present disclosure to those skilled in the art.

Corresponding reference numerals indicate corresponding parts or features throughout the several views of the drawings.

DETAILED DESCRIPTION

Example embodiments will now be described more fully with reference to the accompanying drawings.

With respect to the related art discussed hereinbefore, if the pre-stage communication apparatus has multiple post-stage communication apparatuses, for example, in a point-to-point communication system constituted by an LCD TV, the pre-stage communication apparatus includes the main drive control chip, and its post-stage communication apparatus includes multiple column drive control chips. When the operating frequency of the main drive control chip is unstable, column drive control chips will recognize the abnormality of valid data. As long as one column drive control chip recognizes such abnormality, it would initiate a clock training request, which might cause multiple column drive control chips to initiate clock training requests at different time, resulting in the LCD television performing clock training multiple times intermittently, and further give rise to a phenomenon that the LCD television works abnormally, i.e. it occurs that the display screen of the display panel starts flashing constantly at the moment that the television is started.

In addition, to avoid the problem that the display screen starts flashing constantly at the moment that the LCD television is started, there are two existing common controlling methods for frequency synchronization. The first method is to delay the powering-on of the delay panel when the LCD television is started, which increases the boot time of the LCD television, and would contribute to the problems that the waiting time of a user is too long and the user experience is poor. The second method is to add the fault-tolerant rate, i.e., a column drive control chip would initiate a clock training request to the main control chip only after it has recognized abnormality of valid data N times consecutively, where how to determine the value of N becomes a bottleneck—if the value of N is too large, abnormality might not be recognized and thus the LCD TV displays abnormally all the time; if the value of N is too small then wrong recognizing results might occur, causing the LCD TV to perform clock training.

FIG. 1 is an implementation environment involved with a controlling method for frequency synchronization. The implementation environment is set within an LCD TV 100, where the LCD TV 100 includes at least one main drive control chip 110, a plurality of column drive control chips 130 and a front-end motherboard chip 150. The main drive control chip 110 transmits data with the column drive control chips 130 in a point-to-point communicative way.

The main drive control chip 110 is configured to receive front-end data sent by the front-end motherboard chip 150, lock its own operating frequency at the frequency corresponding to the front-end data, and send the front-end data to each column drive control chip 130 according to the locked operating frequency, where the front-end data could be transmitted to the main drive control chip 110 in the form of data packet.

A column drive control chip 130 (D-IC, source drive IC) is configured to lock its own operating frequency at the operating frequency of the main drive control chip 110, to receive the front-end data sent by the main drive control chip 110 according to the locked operating frequency and to drive the control panel of the LCD TV to display normally with the front-end data.

It should be noted that, as the display panel of the LCD TV includes multiple columns of subpixels, for example, a 4K2K panel has 12,000 columns of subpixels, while the number of column output control channels included in each of the column drive control chips 130 is limited, and every column of output control channel is connected with every column of subpixels correspondingly, the number of columns of subpixel that could be controlled by each of the column drive control chips 130 is limited. That's why the point-to-point communication system constituted by the LCD TV will include a main drive control chip 110 and a plurality of column drive control chips 130, where front-end data are transmitted between the main drive control chip 110 and the column drive control chips 130 simultaneously.

Figure 2A:
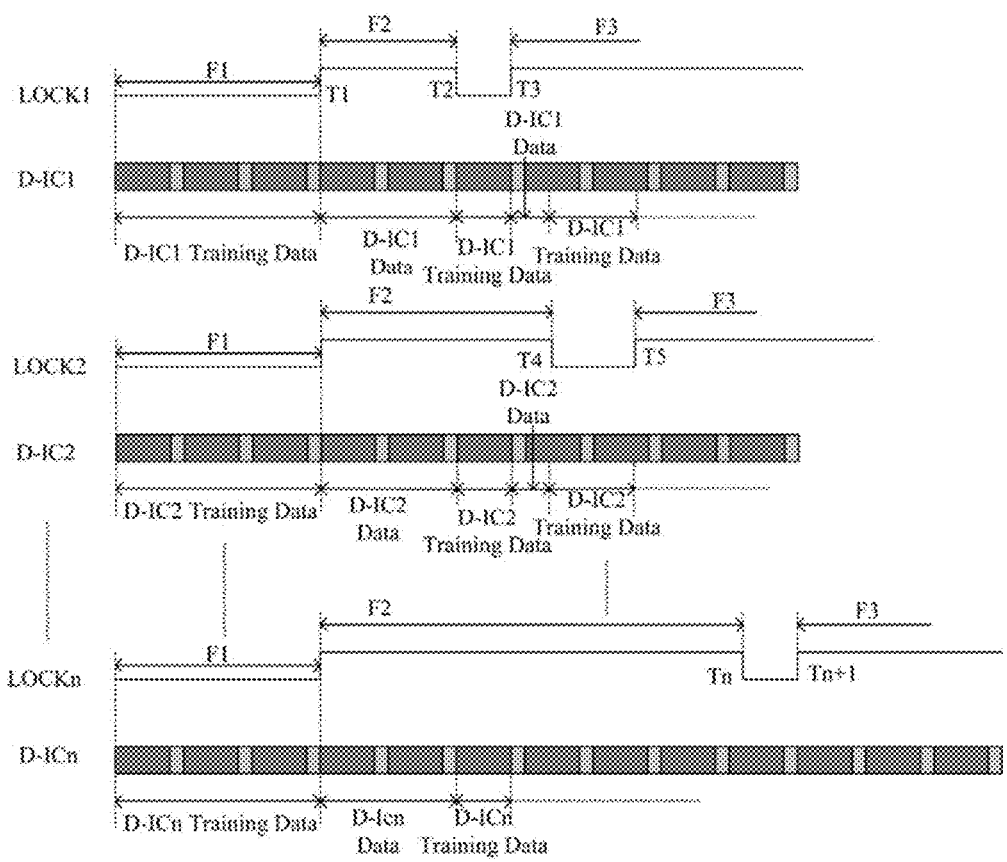
FIG. 2A is a handshake flow chart of frequency synchronization in a point-to-point communication method according to the present disclosure.

FIG. 2A is a handshake flow chart of frequency synchronization in a point-to-point communication method according to the present disclosure. Referring now to FIG. 1 and FIG. 2A, the frequency synchronization process in the existing point-to-point communication method is described below with the LCD TV 100 as an example.

As illustrated by FIG. 2A, at the moment when the smart TV 100 is started, the operating frequency of the main drive control chip 110 is its own inherent frequency F2, and it performs initial clock training on each column drive control chip 130 according to the operating frequency F2, i.e., it sends corresponding clock training data to each column drive control chip 130 according to the operating frequency F2 (e.g., the clock training data corresponding to the column drive control chip D-IC1 is D-IC1 Training DATA).

During the initial clock training process, the operating frequency of each column drive control chip 130 will be adjusted gradually from F1 to the operating frequency F2 of the main drive control chip 110.

At the moment of T1, the clock training of all the column drive control chip 130 is successful, i.e., the operating frequency of all the column drive control chip 130 is locked at the operating frequency F2 of the main drive control chip 110, and the frequency-lock pins corresponding to each column drive control chip 130 respectively output high-level signals (e.g., the frequency-lock pin corresponding to the column drive control chip D-IC1 is LOCK1, and its corresponding output is a high-level signal).

Meanwhile, the main drive control chip 110 starts to transmit corresponding front-end data to each of the column drive control chips 130 according to the operating frequency F2 (e.g., the front-end data corresponding to the column drive control chip D-IC1 is D-IC1 DATA), so that each of the column drive control chips 130 drives the display panel of the LCD-TV 100 to display normally according to the corresponding front-end data.

Through the abovementioned process, each of the column drive control chips 130 could enter into the locking process of operation frequency at the moment when the LCD TV 100 is started, and enter into operating state to complement subsequent task of driving the display. It should be noted that, in the initial clock training process, the clock training of each column drive control chip 130 is performed at the same time, as illustrated in FIG. 2A, so there is not such a problem that the operating stability of the LCD TV 100 is bad.

Moreover, after every column control chip 130 has entered operating state, if the operating frequency of the main drive control chip 110 is still unstable, locked operating frequency of each column drive control chip 130 would not synchronize with the operating frequency of the main drive control chip 110, further causing abnormality in the front-end data received by each column drive control chip 130, i.e. probabilistic errors would occur.

If each column drive control chip 130 detects that certain bits of the front-end data remain unchanged consecutively, for example, the third bit of every one of a certain number of packets corresponding to the front-end data is 0 or 1, it recognizes that the front-end data is abnormal and the operating frequency of the main drive control chip 110 is unstable, and then it initiates a clock training request to the main drive control chip 110 to start clock training again, which might cause the LCD TV 100 to perform clock training several times intermittently and worsen the operating stability of the LCD TV 100.

When the LCD TV 100 starts, after every column control chip 130 enters operating state, the operating frequency of the main drive control chip 110 is still unstable, for example, if the frequency corresponding to the front-end data received by the main drive control chip 110 is F3, then the main drive control chip 110 would adjust its operating frequency from F2 to F3. Correspondingly, each column drive control chip 130 will recognize the abnormality.

Suppose at the moment of T2, if the column drive control chip D-IC1 recognizes abnormality and initiates a clock training request to the main drive control chip 110. Since the other column drive control chips 130 do not recognize abnormality, clock training is performed only on the column drive control chip D-IC1 at the moment of T2-T3, and the other column drive control chips 130 are in waiting process. At the same time, the frequency-lock pin LOCK1 corresponding to the column drive control chip D-IC1 would output a low-level signal while the outputs of the frequency-lock pins corresponding to other column drive control chips 130 remain the same.

At the moment of T3, the clock training for the column drive control chip D-IC1 succeeds, i.e., the operating frequency of the column drive control chip D-IC1 locks at the operating frequency F3 of the main drive control chip 110, and the main drive control chip 110 transmits corresponding front-end D-IC1 DATA to the column drive control chip D-IC1 according to the operating frequency F3.

At the moment of T4, the column drive control chip D-IC2 recognizes abnormality and initiates a clock training request to the main drive control chip 110. Since the other column drive control chips 130 do not recognize abnormality, clock training is performed only on the column drive control chip D-IC2 at the moment of T4-T5, while the other column drive control chips 130 are in waiting process. At the same time, the frequency-lock pin LOCK2 corresponding to the column drive control chip D-IC2 would output a low-level signal, while the outputs of the frequency-lock pins corresponding to other column drive control chips 130 remain the same.

At the moment of T5, the clock training of the column drive control chip D-IC2 succeeds, i.e. the operating frequency of the column drive control chip D-IC2 locks at the operating frequency F3 of the main drive control chip 110, the main drive control chip 110 would transmit corresponding front-end data D-IC2 DATA to the column drive control chip D-IC2 according to the operating frequency F3.

And so on, at the moment of Tn, the column drive control chip D-ICn recognizes abnormality, then clock training is only performed on the column drive control chip D-ICn at the moment of Tn-Tn+1. Correspondingly, only the frequency-lock pin LOCKn corresponding to the column drive control chip D-ICn outputs a low-level signal.

Figure 2B:
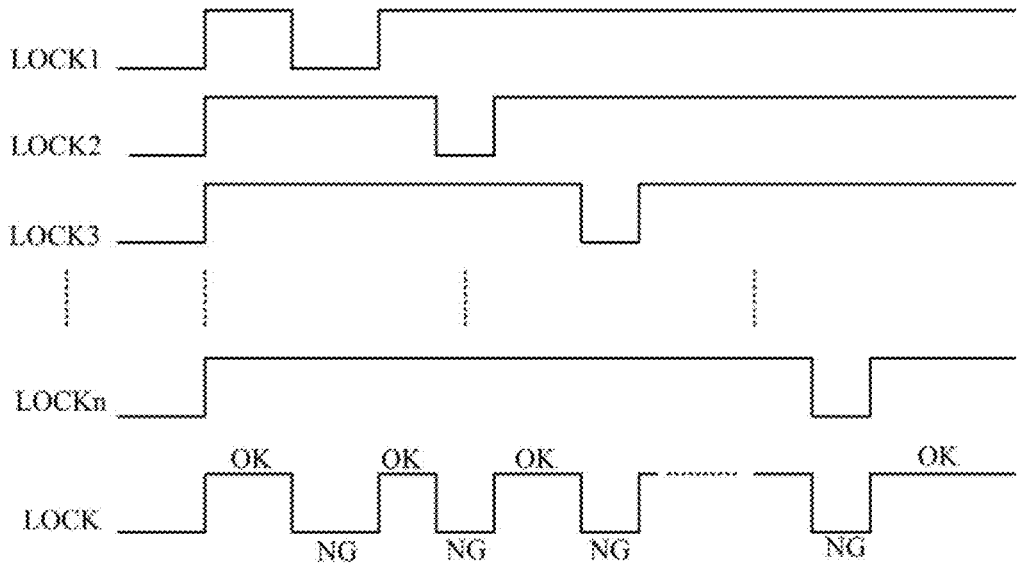
FIG. 2B is a schematic diagram of waveform of a frequency-lock signal at a moment when the smart TV starts according to FIG. 2A.

Since the frequency-lock signal LOCK of the main drive control chip 110 is the AND result of the signals output by the frequency-lock pin corresponding to each of the column drive control chips 130, when the LCD-TV is started, the frequency-lock signal LOCK of the main drive control chip 110 would become high or low continuously, as illustrated in FIG. 2B. When the frequency-lock signal LOCK is high (OK), the main drive control chip 110 sends the front-end data and when the frequency-lock signal LOCK is low (NG), the main drive control chip 110 stops transmitting the front-end data and transmits clock training data, as a result, each column drive control chip 130 receives the front-end data intermittently, and correspondingly the picture being displayed by the display panel flashes continuously.

In addition, when the display panel is displaying normally, if the operating frequency of the main drive control chip 110 becomes unstable because of external interferences, then each of the column drive control chips 130 might recognize the abnormality, which would cause the picture displayed by the display panel to flash continuously and the LCD TV 100 to work abnormally. This process is the same as the described process when the LCD TV 100 is started, and would not be described herein any more.

Therefore, to increase the operating stability of the LCD TV, a controlling method for frequency synchronization is proposed, which could be applied to the LCD TV 100 in the implementation environment illustrated in FIG. 1.

Figure 3:
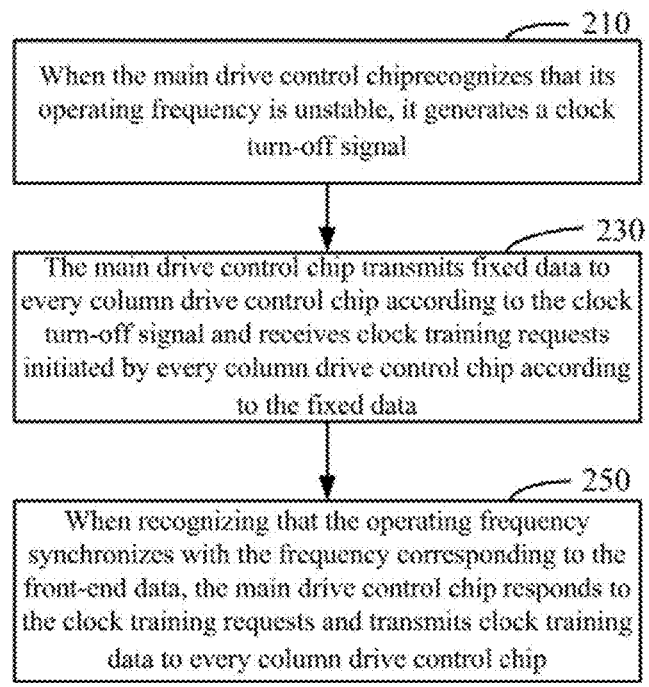
FIG. 3 is a flow chart of a controlling method for frequency synchronization according to some embodiments.

As shown in the FIG. 3, in some embodiments, this controlling method for frequency synchronization may be executed by the main drive control chip 110 of the LCD TV 100 and the method could include the following steps.

Step 210: when the main drive control chip 110 recognizes that its operating frequency is unstable, it generates a clock turn-off signal.

The instability of operating frequency of the main drive control chip might happen at the moment when the LCD TV is started, or when the main drive control chip is externally interfered.

On one hand, the main drive control chip is usually powered on with its own imminent frequency as its operating frequency, and when the frequency corresponding to the front-end data it has received does not synchronize with the imminent frequency, it needs to change its operating frequency and synchronize the operating frequency with the frequency corresponding to the front-end data. Therefore, when having not received any front-end data, the operating frequency of the main drive control chip could be considered as unstable, i.e., at the moment when the LCD TV is started, the instability of the operating frequency of the main drive control chip could be judged by the recognition of received front-end data.

On the other hand, it should be noted that, if there is no external interference, the operating frequency of the main drive control chip usually could maintain stable in a pretty long time. Therefore, the instability of the operating frequency could be recognized by judging whether or not the operating frequency jitters when the LCD TV has been started. For example, it could be judged through the number of clock impulses corresponding to the operating frequency whether or not the operating frequency of the main drive control chip is stable.

In some embodiments, the clock turn-off signal is configured to represent that the operating frequency of the main drive control chip is unstable, therefore, once the main drive control chip recognizes that the operating frequency is unstable, it could generate a clock turn-off signal to perform subsequent clock training on each of the column drive control chips.

Moreover, the clock turn-off signal could be identified by a valid high impulse, and when it is recognized that the clock turn-off signal is a high impulse, it means the main drive control chip is about to perform clock training on each column drive control chip.

Step 230: the main drive control chip 110 transmits fixed data to each of the column drive control chips according to the clock turn-off signal and receives clock training requests initiated by each of the column drive control chips according to the fixed data.

The fixed data is configured to enable each column drive control chip to recognize that the operating frequency of the main drive control chip is unstable.

After having recognized that the clock turn-off signal is generated, each column drive control chip could receive the fixed data sent by the main drive control chip simultaneously. For example, the fixed data could be all 0s or all 1s. In addition, the fixed data could be either pre-set or be obtained by extracting and processing the front-end data.

Once all the column drive control chips receive data that is 0 or 1 consecutively, they recognize that the operating frequency of the main drive control chip is unstable, therefore, at the same moment, each column drive control chip initiates a clock training request to the main drive control chip, so that the operating frequency of the main drive control chip could be locked through clock training.

Moreover, a threshold could be set, so that if the number of time that data which is 0 or 1 is received consecutively is larger than the threshold, each column drive control chip would initiate a clock training request to the main drive control chip; otherwise each column drive control chip would keep frequency synchronized, which increase the fault-tolerant rate of the point-to-point communication system.

Step 250: when recognizing that the operating frequency synchronizes with the frequency corresponding to the front-end data, the main drive control chip 110 responds to the clock training requests and transmits clock training data to each of the column drive control chips.

It should be noted that, if the main drive control chip have not received the front-end data, it could perform no clock training on each column drive control chip temporarily, in order to avoid the situation that when waiting to receive the front-end data the operating frequency of the main drive control chip is unstable and clock training is performed on each column drive control chip again. Therefore, clock training could be performed after the main drive control chip has received the front-end data, in order to ensure that after the clock training has been succeeded, each column drive control chip could enter into operating state and transmit the front-end data.

Moreover, if the operating frequency of the main drive control chip does not synchronize with the frequency corresponding to the front-end data, the operating frequency of the main drive control chip needs to be adjusted to be locked at the frequency corresponding to the front-end data, which might cause each column drive control chip to recognize that the operating frequency of the main drive control chip is unstable and clock training to be performed again. Therefore, in some embodiments, a response to the clock training request happens after the operating frequency of the main drive control chip synchronizes with the frequency corresponding to the front-end data.

Moreover, it could be realized through front-end frequency-lock signal to recognize whether or not the operating frequency of the main drive control chip synchronizes with the frequency corresponding to the front-end data. The front-end frequency-lock signal is configured to represent whether or not the operating frequency of the main drive control chip is locked at the frequency corresponding to the front-end data. For example, it indicates that the operating frequency of the main drive control chip synchronizes with the frequency corresponding to the front-end data if the front-end frequency-lock signal is a valid high impulse, on the contrary, it indicates that the two frequencies have not been synchronized if the front-end frequency-lock signal is an invalid low impulse.

It should be noted that, the front-end frequency-lock signal is different from the frequency-lock signal LOCK illustrated in FIG. 3. The frequency-lock signal LOCK is configured to represent whether or not each column drive control chip has locked its operating frequency at the operating frequency of the main drive control chip.

After recognizing that the operating frequency of the main drive control chip corresponds to the frequency corresponding to the front-end data, each column drive control chip could receive clock training data sent by the main drive control chip, complete clock training according to the clock training data, and lock its own operating frequency at the operating frequency of the main drive control chip, thus realizing frequency synchronization between each column drive control chip and the main drive control chip.

Through the abovementioned process, a clock training-frequency lock mechanism is realized, that is, controlling frequency synchronization process of a point-to-point communication system to be performed only after a clock turn-off signal has been generated, which ensures that all the column drive control chips are able to initiate clock training requests at the same time, causes the main drive control chip to start performing clock training on each column drive control chip at the same time, and thus avoid the problem that the operating stability of the point-to-point communication system is bad because the operating frequency of the main drive control chip is unstable and it causes the point-to-point communication system to perform clock training intermittently.

In some embodiments, before the step 210, the abovementioned method could further include the following step:

the main drive control chip 110 enters into a preset self-test mode when the frequency-lock signal is valid and the main drive control chip 110 has not received the front-end data.

The self-test mode is configured to indicate that the operating frequency of the main drive control chip at the moment when the main drive control chip is powered up. In other words, the main drive control chip would enter into the preset self-test mode at the moment the main drive control chip is powered up, to facilitate subsequent clock training on every column drive control chip.

Moreover, it would be recognized that the operating frequency of the main drive control chip is unstable at the moment when the main drive control chip is powered up through a valid frequency-lock signal and the failure to receive the front-end data, where a valid frequency-lock signal is configured to represent that each of the column drive control chips has locked its operating frequency at the operating frequency of the main drive control chip.

In some embodiments, at the moment of powering up, the initial clock training performed by each of the column drive control chips would not result in a bad operating stability of the point-to-point communication system, and the main drive control chip would lock its own operating frequency at the frequency corresponding to the front-end data after having received the front-end data, therefore, at the moment of powering up, it would happen after the initial clocking training of each of the column drive control chips is successful and before the operating frequency of the main drive control chip synchronizes with the frequency corresponding to the front-end data that the operating frequency of the main drive control chip is unstable.

Moreover, after the initial clock training of each of the column drive control chips is successful, the column drive control chip would correspondingly output a valid-level signal representing that the operating frequency has been successfully locked, for example, a high-level signal. Because the frequency-lock signal of the main drive control chip is the AND result of the signals output by each of the column drive control chips correspondingly, the frequency-lock signal of the main drive control chip would be marked as valid correspondingly.

Therefore, in some embodiments, it would reflect that the operating frequency of the main drive control chip is unstable at the moment of powering up if the frequency-lock signal is valid and the front-end data is not received, causing the main drive control chip to enter into the self-test mode in preparation for performing clock training on each of the column drive control chips.

Correspondingly, the step 210 could include the following operation:

the main drive control chip 110 recognizes the received front-end data in the preset self-test mode and generates a clock turn-off signal through the recognized front-end data.

As described before, the clock training could be performed after the main drive control chip has received the front-end data, in order to ensure that each of the column drive control chips could enter into operating state and transmit the front-end data once the clock training is successful, thus improving the efficiency of the clock training.

The clock turn-off signal can be generated through recognition for received front-end data, for example, the front-end data is usually set with an initial identifier which represents that the front-end data has been sent, and thus the recognition is directed at the initial identifier of the front-end data. For example, the initial identifier can be a valid high impulse signal, it indicates that the reception of the front-end data has been started when the initial identifier is recognized as valid high impulse.

After recognizing that the reception of the front-end data has been started, the main drive control chip determines that it could start to prepare for the clock training of each of the column drive control chips and correspondingly generates a clock turn-off signal, which is, for example, to raise the clock turn-off signal by one impulse and mark it with a valid high impulse.

Figure 4:
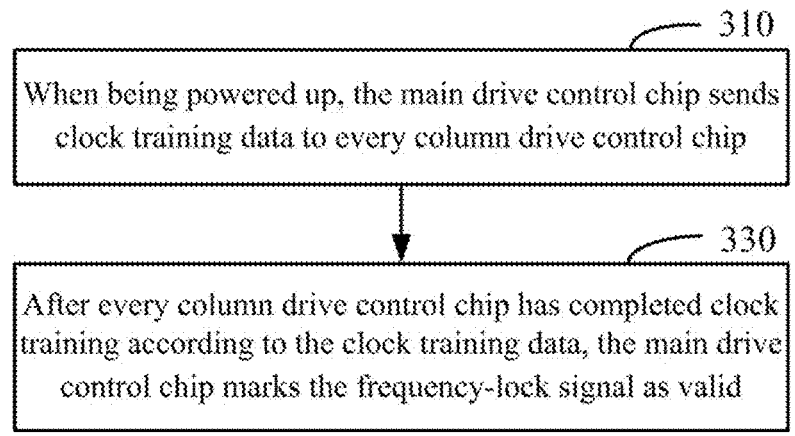
FIG. 4 is a flow chart of another controlling method for frequency synchronization according to some embodiments.

As shown in FIG. 4, in some embodiments, when the frequency-lock signal is valid and the main drive control chip has not received any front-end data, and before the main drive control chip enters into the preset self-test mode, the abovementioned method could also include the following steps.

Step 310: when being powered up, the main drive control chip 110 sends clock training data to each of the column drive control chips.

Step 330: after each of the column drive control chips has completed clock training according to the clock training data, the main drive control chip 110 marks the frequency-lock signal as valid.

As described above, when being powered up, the main drive control chip sends clock training data to each of the column drive control chips so that each of the column drive control chips could lock its operating frequency at the operating frequency of the main drive control chip.

Once the clock training data has been received, each of the column drive control chips performs clock training according to the clock training data, to lock its own operating frequency at the operating frequency of the main drive control chip, thus finishing the clock training.

Moreover, after each of the column drive control chips completes the clock training, each of the column drive control chips would correspondingly output a valid-level signal configured to represent that its operating frequency has been locked successfully—for example, a high-level signal is used as a valid-level signal, and send it to the main drive control chip.

The main drive control chip marks its own frequency-lock signal according to the AND result of the received signals output by each of the column drive control chips correspondingly, in order to indicate whether or not each of the column drive control chips has locked its operating frequency at the operating frequency of the main drive control chip. For example, if the AND result is 1, then the frequency-lock signal is marked as valid to represent that each of the column drive control chips has locked its operating frequency at the operating frequency of the main drive control chip, that is, all the column drive control chips' frequencies are synchronized.

In some embodiments, before the step 210, the above-mentioned method could include the following step:

if the number of clock impulses included in the clock impulse signal generated by each of the column drive control chips is not within a preset range, then the frequency-lock signal is marked as invalid.

As described above, after power-up, the instability of operating frequency of the main drive control chip could be recognized by judging whether or not the operating frequency has jittered.

When the main drive control chip is interfered externally, its own operating frequency might be unstable, causing the column drive control chips unable to lock their operating frequencies and the number of clock impulses included in the clock impulse signals generated by the column drive control chips to change. In addition, as locked operating frequencies of the column drive control chips do not synchronize the operating frequency of the main drive control chip, probabilistic errors occur in the front-end data received by the column drive control chips and clock training is required again.

Therefore, it could be judged whether or not the operating frequency of the main drive control chip is stable by judging whether or not the number of clock impulses included in a clock impulse signal is within a preset range.

Optionally, after the operating frequency of a column drive control chip is locked at the operating frequency of the main drive control chip, the column drive control chip will generate a clock impulse signal, in order to mark its own operating frequency with the number of clock impulses included in the clock impulse signal. For example, if the operating frequency is 100 MHZ, the number of clock impulses included in the clock impulse signal is 10 and if the operating frequency is 200 MHz, the number of clock impulses included in the clock impulse signal is 20.

Suppose the preset range is 9-10, if the number of clock impulses is 12, it means that the column drive control chip fails to lock its operating frequency at the operating frequency of the main drive control chip, which is 100 MHz, and it recognizes that the operating frequency of the main drive control chip is unstable.

Moreover, after having recognized that the number of clock impulses is not within a preset range, the column drive control chip will output an invalid-level signal (e.g., a low-level signal) to indicate that the lock of its operating frequency fails. Because the frequency-lock signal of the main drive control chip is the AND result of the signals output by each column drive control chip correspondingly, the frequency-lock signal of the main drive control chip is marked as invalid, to facilitate new clock training on the column drive control chips.

Correspondingly, the step 210 could include a following step:

the main drive control chip 110 generates a clock turn-off signal according to the invalid frequency-lock signal.

After the main drive control chip marks the frequency-lock signal as invalid, the main drive control chip judges that its own operating frequency is unstable and it needs to perform clock training on each of the column drive control chips again, thus correspondingly generate a clock turn-off signal. For example, the main drive control chip raises the clock turn-off signal by one impulse and mark it with a valid high impulse.

Figure 5:
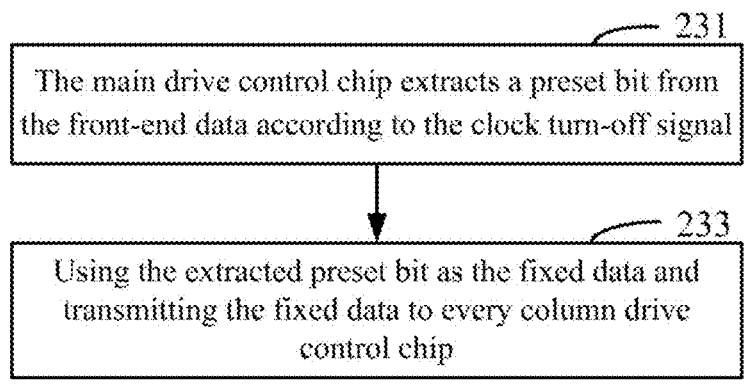
FIG. 5 is a flow chart of the operations of transmitting fixed data to every post-stage communication device according to the clock turning-off signal according to one embodiment corresponding to FIG. 3.

As shown in FIG. 5, in some embodiments, the operation of transmitting fixed data to each of the column drive control chips according to the clock turn-off signal could include the following steps.

Step 231: the main drive control chip 110 extracts a preset bit from the front-end data according to the clock turn-off signal.

Once after recognizing that a clock turn-off signal has been generated, the main drive control chip transmits the fixed-data. In the present embodiment, the fixed data is obtained by extracting process performed on the front-end data.

It could be understood that the front-end data is represented by bit. For example, the front-end data includes 32 bits. Moreover, the extraction of the fixed data could be performed on a preset bit of the front-end data. For example, the preset bit could be the highest bit of the front-end data (the $31^{st}$ bit) or the lowest bit (the $0^{th}$ bit), or another arbitrary bit of the front-end data (the $15^{th}$ bit). Correspondingly, the fixed data also includes 32 bits and each of the bits is the preset bit.

Step 233: the main drive control chip 110 uses the extracted preset bit as the fixed data and transmits the fixed data to each of the column drive control chips.

After extracting the preset bit, the main drive control chip sends the preset bit as the fixed data consecutively to each column drive control chip, so that each of the column drive control chips could recognize that the operating frequency of the main drive control chip is unstable.

Through the abovementioned process, consecutive data (the fixed data consists of all 0s or all 1s) is transmitted consecutively, which avoids prolonging the start-up time of the main drive control chip, increases the fault-tolerant rate of the point-to-point communication system, and thus it would not happen that the clock training requests are not sent because the number of times that each of the column drive control chips recognizes consecutive data is too small, or that the clock training requests are sent by mistake because the number of times that each column drive control chip recognizes consecutive data is too big.

In some embodiments, before the step 250, the above-mentioned method could also include the following step:

the main drive control chip adjusts its operating frequency according to the frequency corresponding to the front-end data, so that the operating frequency could be locked at the frequency corresponding to the front-end data.

As described above, the clock training requests is responded after the operating synchronization of the main drive control chip synchronizes with the frequency corresponding to the front-end data.

Therefore, in order to synchronize the operating frequency of the main drive control chip with the frequency corresponding to the front-end data, the operating frequency of the main drive control chip would be adjusted so that the operating frequency is locked at the frequency corresponding to the front-end data.

Figure 6:
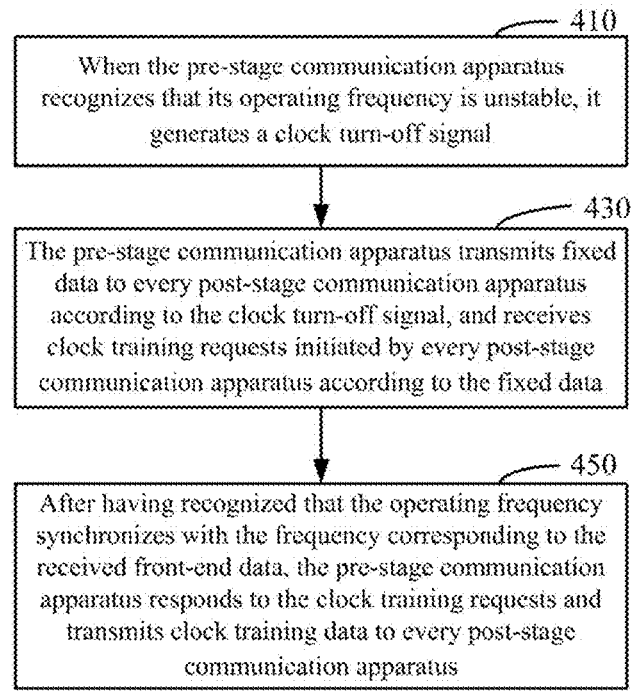
FIG. 6 is a flow chart of a controlling method for frequency synchronization according to some embodiments.

Moreover, the adjustment of the operating frequency according to the frequency corresponding to the front-end data could be realized by phase-locked loop. As shown in FIG. 6, some embodiments provide a controlling method for frequency synchronization, applied in a point-to-point communication system, where the point-to-point communication system includes a pre-stage communication apparatus and a plurality of post-stage communication apparatuses, and the method could be executed by the pre-stage communication device, the method includes the following steps.

Step 410: when the pre-stage communication apparatus recognizes that its operating frequency is unstable, it generates a clock turn-off signal.

Step 430: the pre-stage communication apparatus transmits fixed data to each of the post-stage communication apparatuses according to the clock turn-off signal, and receives a clock training request initiated by each of the post-stage communication apparatuses according to the fixed data.

Step 450: after having recognized that the operating frequency synchronizes with the frequency corresponding to the received front-end data, the pre-stage communication apparatus responds to the clock training request and transmits clock training data to each of the post-stage communication apparatuses.

The process above could ensure that every post-stage communication device could initiate a clock training request to the pre-stage communication device and the pre-stage communication device could respond to the clock training requests at the same time, thus avoiding the point-to-point communication system performing clock training intermittently, and improving operating stability of the point-to-point communication system.

Figure 7:
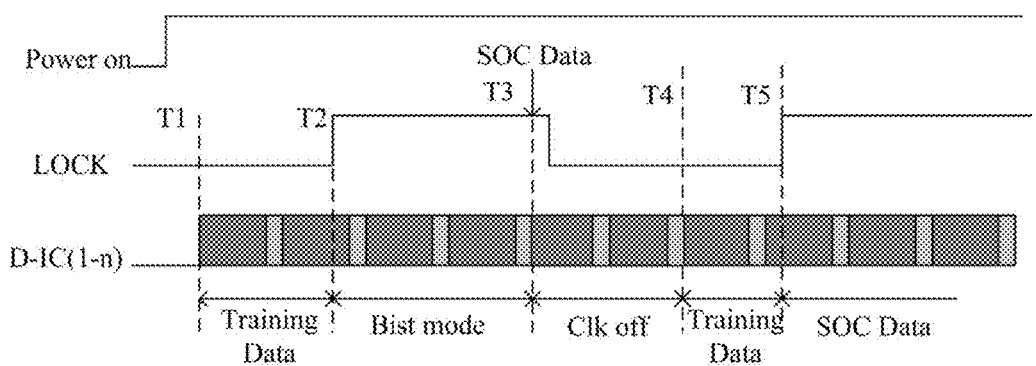
FIG. 7 is a concrete implementation flow chart of a controlling method for frequency synchronization in an application scenario.

FIG. 7 is a flow chart of the implementation of the controlling method for frequency synchronization in an application scenario. Now take it as an example that the point-to-point communication system is an LCD TV, where it includes a main drive control chip and a plurality of column drive control chips, and explain the flow chart of the implementation.

After the LCD TV has been power up, the Power on signal is raised and when recognizing the rising edge of the Power on signal, at the moment of T1, the main drive control chip transmits Training Data (clock training data) to each of the column drive control chips at its own operating frequency (the imminent frequency), to perform initial clock training on each of the column drive control chips and have the operating frequency of each of the column drive control chips locked at the imminent frequency of the main drive control chip.

At the moment of T2, each of the column drive control chips has been successful in its clock training, and the frequency-lock signal LOCK of the main drive control chip is raised. Because the front-end data (SOC data) sent by the front-end motherboard chip has not been received yet, the main drive control chip will transmit data to each of the column drive control chips at its own operating frequency and enter into the preset self-test mode (Bist mode).

In the Bist mode, at the moment of T3, when the main drive control chip has received the SOC data, it generates the clock turn-off signal (Clk off signal), and transmits the fixed data to each of the column drive control chips at the current operating frequency according to the Clk off signal to obtain the clock training request initiated by each of the column drive control chips according to the fixed data and lowers the frequency-lock signal LOCK.

When the operating frequency of the main drive control chip is locked at the frequency corresponding to the SOC Data, it means that the operating frequency of the main drive control chip is stable, which is at the moment of T4, then the main drive control chip responds to the clock training request and transmits the training data to each of the column drive control chips. Each column drive control chip performs the clock training according to the training data, and locks its operating frequency at the operating frequency of the main drive control chip at the moment of T5, where the operating frequency of the main drive control chip at the moment of T5 is the frequency corresponding to the SOC Data, and the frequency-lock signal LOCK is raised again.

At this point, the point-to-point communication system has completed the frequency synchronization of communication devices of every stage, each of the column drive control chips enters into operating states, receives the SOC Data at its own operating frequency and drives the LCD TV's display panel to display normally according to the SOC data.

In addition, when the display panel of the LCD TV is displaying normally, if the operating frequency of the main drive control chip is interfered externally and thus is unstable, the main drive control chip would generate a clock turn-off signal again to complete the subsequent clock training of each of the column drive control chips. The process is the same as the abovementioned process when the LCD TV is being powered up and thus is not going to be described again here.

In embodiments of the present disclosure, the abovementioned process ensures that each of the column drive control chips could initiate a clock training request to the main drive control chip at the same time, and the main drive control chip could respond to the clock training requests at the same time, avoiding that the picture displayed in the display panel of the LCD TV is displayed abnormally from time to time, thus improving the displaying stability of the LCD TV.

Below are the device embodiments of the present disclosure, which could be configured to execute the controlling method for frequency synchronization according to the present disclosure. For the details that are not disclosed in the device embodiments of the present disclosure, please refer to the embodiments of the controlling method for frequency synchronization according to the present disclosure.

Figure 8:
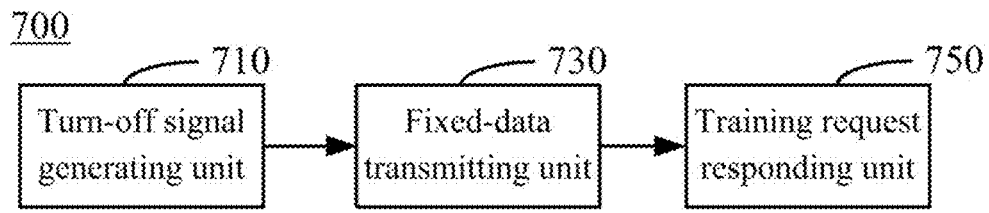
FIG. 8 is a block diagram of a device for frequency synchronization according to some embodiments.

As shown in FIG. 8, some embodiments provide a controlling device 700 for frequency synchronization, applied to a LCD TV, where the LCD TV includes a front-end motherboard chip, a main drive control chip and a plurality of column drive control chips are integrated within. The device 700 includes but is not limited to: a turn-off signal generating unit 710, a fixed-data transmitting unit 730 and a training request responding unit 750.

The turn-off signal generating unit 710 is configured to generate a clock turn-off signal when recognizing that the operating frequency of main drive control chip is unstable.

The fixed-data transmitting unit 730 is configured to transmit fixed data to each of the column drive control chips according to the clock turn-off signal and receive clock a training request initiated by each of the column drive control chips according to the fixed data.

The training request responding unit 750 is configured to respond to the clock training requests and transmit clock training data to each of the column drive control chips after having recognized that the operating frequency of the main drive control chip synchronizes with the frequency corresponding to front-end data transmitted by the front-end motherboard chip.

In some embodiments, the abovementioned device 700 includes but is not limited to: a self-test entering unit.

The self-test entering unit is configured to control the main drive control chip to enter a preset self-test mode when the frequency-lock signal is valid and the front-end data has not been received.

It represents that each of the column drive control chips has locked its operating frequency at the frequency of the main drive control chip if the frequency-lock signal is valid, and the number of clock impulses is configured to mark the operating frequency.

Correspondingly, the turn-off signal generating unit 710 includes but is not limited to: a front-end data recognition module.

The front-end data recognition module recognizes the front-end data received by the main drive control chip in the preset self-test mode and generate a clock turn-off signal according to the recognized front-end data.

Figure 9:
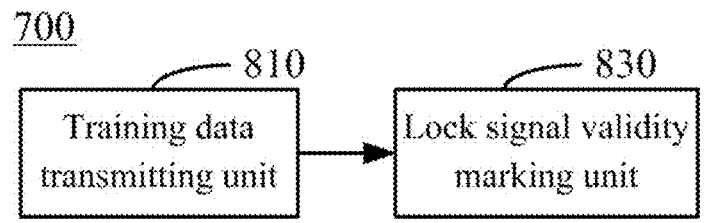
FIG. 9 is block diagram of another device for frequency synchronization according to some embodiments.

As shown in FIG. 9. In some embodiments, the abovementioned device 700 further includes but is not limited to: a training data transmitting unit 810 and a lock signal validity marking unit 830.

The training data transmission unit 810 is configured to transmit the clock training data to each of the column drive control chips at the time of powering up.

The lock signal validity marking unit 830 is configured to mark the frequency-lock signal as valid after each of the column drive control chips has finished the clock training according to the clock training data.

In some embodiments, the device 700 further includes but is not limited to: a lock signal invalidity marking unit.

The lock signal invalidity marking unit is configured to mark the frequency lock signal as invalid when the number of clock impulses included in the clock impulse signals generated by each of the column drive control chips is not within the preset range.

Correspondingly, the turn-off signal generating unit 710 includes but is not limited to: a generation module.

The generation module is configured to generate a clock turn-off signal according to an invalid frequency-lock signal.

Figure 10:
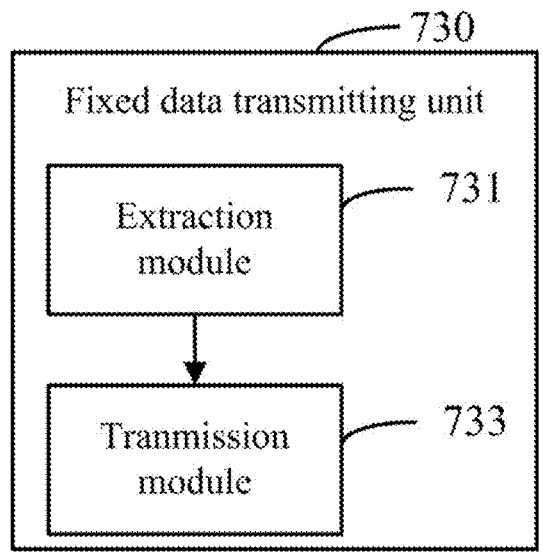
FIG. 10 is a block diagram of the fixed data transmitting unit according to some embodiments corresponding to FIG. 8.

As shown in FIG. 10, in some embodiments, the fixed-data transmitting unit 730 includes but is not limited to: an extraction module 731 and a transmission module 733.

The extraction module 731 is configured to perform preset bit extraction on the front-end data according to the clock turn-off signal.

The transmission module 733 is configured to transmit the extracted preset bit as the fixed data to each of the column drive control chips.

In some embodiments, the abovementioned device 700 includes but is not limited to: a frequency adjusting unit.

The frequency adjusting unit is configured to adjust the operating frequency of the main drive control chip according to the frequency corresponding to the front-end data, so that the operating frequency of the main drive control chip could be locked at the frequency corresponding to the front-end data.

It should be noted that, the frequency synchronization process of the controlling device for frequency synchronization according to the abovementioned embodiments, is exemplified only by the division of the above-described functional modules. In practice, the above-described functions may be assigned to different functional modules to be completed as needed, that is, the internal structure of the controlling device for frequency synchronization will be divided into different functional modules to complete all or part of the functions described above.

Figure 11:
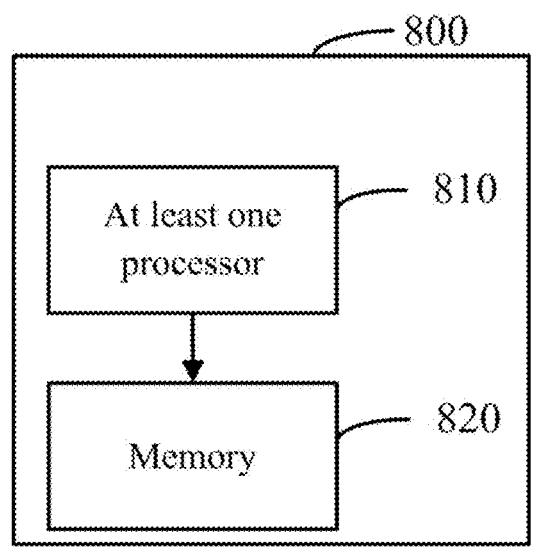
FIG. 11 is a block diagram of another controlling device for frequency synchronization according to some embodiments.

As shown in FIG. 11. Some embodiments provide another controlling device 800 for frequency synchronization. The device 800 is applied to an LCD TV, where the LCD TV includes a front-end motherboard chip, a main drive control chip and a plurality of column drive control chips. The device 800 includes at least one processor 810 and a memory 820. In some embodiments, the processor 810 can be the main drive control chip, in other words, the main drive control chip is common to the LCD TV and the device 800. The memory 820 stores therein instructions executable by the at least one processor 810, and the instructions are executed by the at least one processor to enable the at least one processor to:

when recognizing that operating frequency of the main drive control chip is unstable, generate a clock turn-off signal;

transmit fixed data to each of the column drive control chips according to the clock turn-off signal and receive a clock training request initiated by each of the column drive control chips according to the fixed data;

after having recognized that the operating frequency synchronizes with the frequency corresponding to the front-end data transmitted by the front-end motherboard chip, respond to the clock training requests and transmit clock training data to each of the column drive control chips.

The at least one processor 810 is further configured to:

when recognizing the operating frequency of the main drive control chip is unstable, before the operation of generating the clock turn-off signal, control the main drive control chip to enter self-test mode when the frequency-lock signal is valid and the front-end data has not been received; where it represents that each column drive control chip has locked its operating frequency at the operating frequency of the main drive control chip when the frequency-lock signal is valid.

The at least one process 810 is configured to generate a clock turn-off signal by the following operation:

recognizing the front-end data received by the main drive control chip in the preset self-test mode and generating the clock turn-off signal according to the recognized front-end data.

The at least one processor 810 is further configured to perform the following operations:

when the frequency-lock signal is valid and the front-end data has not been received, before the operation of controlling the main drive control chip to enter a self-test mode, sending clock training data to each column drive control chip when being powered up;

marking the frequency-lock signal as valid after each column drive control chip has finished clock training according to the clock training data.

The at least one processor 810 is further configured to:

when recognizing that the operating frequency of the main drive control chip is unstable and before the operation of generating a clock turn-off signal, if the number of clock impulses included in the clock impulse signal generated by each column drive control chip is not within a preset range, mark the frequency-lock signal as invalid.

The at least one processor 810 is configured to generate a clock turn-off signal by:

generating the clock turn-off signal according to the invalid frequency-lock signal.

The at least one processor 810 is configured to transmit fixed data to each column drive control chip according to the clock turn-off signal by the following operations:

extracting a preset bit from the front-end data according to the clock turn-off signal;

transmitting the extracted preset bit as the fixed data to each of the column drive control chips.

The at least one processor is further configured to:

when recognizing that the operating frequency of the main drive control chip synchronizes with the frequency corresponding to the front-end data sent by the front-end motherboard chip, before the operation of transmitting clock training data to each column drive control chip in response to the clock training request, adjust the operating frequency of the main drive control chip according to the frequency corresponding to the front-end data, so that the operating frequency of the main drive control chip is locked at the frequency corresponding to the front-end data.

The at least one processor 810 recognizes that operating frequency of the main drive control chip is unstable, by:

at the moment of powering up, when the main drive control chip has not received the front-end data, the at least one processor 810 recognizes that the operating frequency of the main drive control chip is unstable.

The at least one processor 810 recognizes that operating frequency of the main drive control chip is unstable, by:

after powering up, if the at least one processor 810 determines that the operating frequency of the main drive control chip jitters, the at least one processor 810 recognizes that the operating frequency of the main drive control chip is unstable.

The at least one processor 810 determines that the operating frequency of the main drive control chip jitters, by:

if the at least one processor 810 determines that the number of clock impulses corresponding to the operating frequency of the main drive control chip changes, determining that the operating frequency of the main drive control chip jitters.

Figure 12:
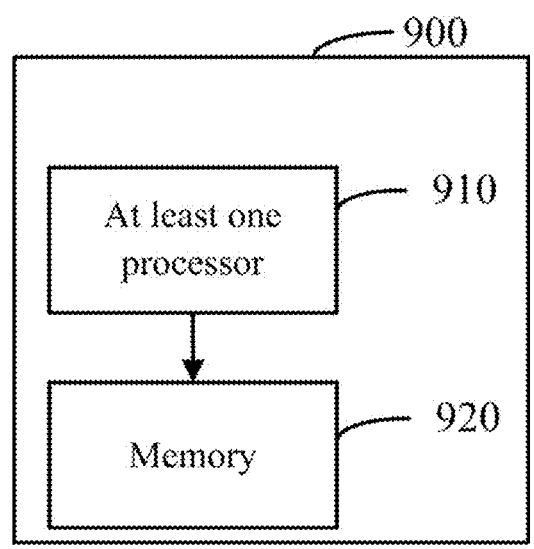
FIG. 12 is a block diagram of another controlling device for frequency synchronization according to some embodiments.

As shown in FIG. 12, some embodiments provides another controlling device 900 for frequency synchronization, applied to a point-to-point system, where the point-to-point communication system includes a pre-stage communication apparatus and a plurality of post-stage communication apparatuses, the device 900 including: at least one processor 910 and a memory 920. In some embodiments, the processor 910 can be the main drive control chip, in other words, the main drive control chip is common to the LCD TV and the device 900. The memory 920 stores therein instructions executable by the at least one processor 910, and the instructions are executed by the at least one processor 910 to enable the at least one processor 910 to:

when recognizing that the operating frequency of the pre-stage communication apparatus is unstable, generate a clock turn-off signal; transmit fixed data to each of the post-stage communication apparatuses according to the clock turn-off signal and receive a clock training request initiated by each of the post-stage communication apparatuses according to the fixed data; after having recognized that the operating frequency of the pre-stage communication apparatus synchronizes with the frequency corresponding to received front-end data, respond to the clock training request and transmit clock training data to each of the post-stage communication apparatuses.

The controlling device for frequency synchronization and the controlling method for frequency synchronization according to the abovementioned embodiments belong to the same conception, and the specific mode in which each module performs the operations has been described in detail in the method embodiments, which would not be described here again.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A controlling device for frequency synchronization in an LCD TV including a front-end motherboard chip, a main drive control chip and a plurality of column drive control chips, the controlling device comprising the main drive control chip and a memory, the main drive control chip being common to the LCD TV and the controlling device, wherein the memory is configured to store instructions executable by the main drive control chip, and the main drive control chip is configured to execute the instructions to:

when recognizing that an operating frequency of the main drive control chip is unstable, generate a clock turn-off signal;

transmit fixed data to each of the plurality of column drive control chips according to the clock turn-off signal and receive a clock training request initiated by said each of the plurality of column drive control chips according to the fixed data; and when recognizing that the operating frequency synchronizes with the frequency corresponding to front-end data transmitted by the front-end motherboard chip, respond to the clock training request and transmit clock training data to said each of the plurality of column drive control chips.

2. The device according to claim 1, wherein the main drive control chip is further configured to execute the instructions to:

before generating the clock turn-off signal when recognizing that the operating frequency of the main drive control chip is unstable, mark a frequency-lock signal as invalid if a number of clock impulses included in a clock impulse signal generated by said each of the plurality of column drive control chips is not within a preset range; and generate a clock turn-off signal by generating the clock turn-off signal according to an invalid frequency-lock signal.

3. The device according to claim 1, wherein the main drive control chip is further configured to execute the instructions to extract a preset bit from the front-end data according to the clock turn-off signal and transmit the extracted preset bit as the fixed data to said each of the plurality of column drive control chips to transmit the fixed data to said each of the plurality of column drive control chips according to the clock turn-off signal.

4. The device according to claim 1, wherein the main drive control chip is further configured to execute the instructions to:

before responding to the clock training request and transmitting the clock training data, adjust the operating frequency of the main drive control chip according to the frequency corresponding to the front-end data to lock the operating frequency of the main drive control chip at the frequency corresponding to the front-end data.

5. The device according to claim 1, wherein the main drive control chip is further configured to execute the instructions to:

at a moment of powering up, when the main drive control chip has not received the front-end data, recognize that the operating frequency of the main drive control chip is unstable.

6. The device according to claim 1, wherein the main drive control chip is further configured to execute the instructions to:

at a moment when the main drive control has been powered up, recognize that the operating frequency of the main drive control chip is unstable when determining that the operating frequency of the main drive control chip jitters.

7. The device according to claim 6, wherein the main drive control chip is further configured to execute the instructions to:

determine that the operating frequency of the main drive control chip jitters when determining that a number of clock impulses corresponding to the operating frequency of the main drive control chip changes.

8. A controlling method for frequency synchronization, applied to a LCD TV, wherein the LCD TV comprises a front-end motherboard chip, a main drive control chip and a plurality of column drive control chips, the method comprises:

generating a clock turn-off signal when the main drive control chip recognizes that its operating frequency is unstable;

transmitting fixed data to each of the plurality of column drive control chips according to the clock turn-off signal and receiving a clock training request initiated by said each of the plurality of column drive control chips according to the fixed data; and when the main drive control chip recognizes that the operating frequency synchronizes with a frequency corresponding to front-end data transmitted by the front-end motherboard chip, responding to the clock training request and transmitting clock training data to said each of the plurality of column drive control chips.

9. The method according to claim 8, wherein:

before generating the clock turn-off signal, the method further comprises when a number of clock impulses included in a clock impulse signal generated by each of the column drive control chips is not within a preset range, marking a frequency-lock signal as invalid; and generating the clock turn-off signal comprises generating the clock turn-off signal according to the invalid frequency-lock signal.

10. The method according to claim 8, wherein transmitting the fixed data comprises:

extracting a preset bit from the front-end data according to the clock turn-off signal; and transmitting the extracted preset bit as the fixed data to said each of the plurality of column drive control chips.

11. The method according to claim 8, wherein before responding to the clock training requests and transmitting the clock training data, the method further comprises:

adjusting the operating frequency according to the frequency corresponding to the front-end data to lock the operating frequency at the frequency corresponding to the front-end data.

12. The method according to claim 8, wherein the main drive control chip recognizes that its operating frequency is unstable by recognizing, at a moment of powering up, that its operating frequency is unstable when the main drive control chip has not received the front-end data.

13. The method according to claim 8, wherein the main drive control chip recognizes that its operating frequency is unstable by recognizing at a moment when the main drive control has been powered up, that its operating frequency is unstable when it determines that its operating frequency jitters.

14. The method according to claim 13, wherein the main drive control chip recognizes that its operating frequency jitters when the main drive control chip determines that a number of clock impulses corresponding to the operating frequency of the main drive control chip changes.

15. A controlling method for frequency synchronization, applied to a point-to-point communication system, wherein the point-to-point communication system comprises a pre-stage communication apparatus and a plurality of post-stage communication apparatuses including a plurality of column drive control chips, the method comprising:

generating a clock turn-off signal when the pre-stage communication apparatus recognizes that its operating frequency is unstable;

transmitting fixed data to each of the plurality of post-stage communication apparatuses according to the clock turn-off signal, and receiving a clock training request initiated by said each of the plurality of post-stage communication apparatuses according to the fixed data; and when recognizing that the operating frequency synchronizes with a frequency corresponding to received front-end data, responding to the clock training request and transmitting clock training data to said each of the plurality of post-stage communication apparatuses.

* * * * *